(12) United States Patent
Chamarajnagar

(10) Patent No.: US 10,515,079 B2
(45) Date of Patent: Dec. 24, 2019

(54) AUTO TUNING DATA ANOMALY DETECTION

(71) Applicant: AirWatch LLC, Atlanta, GA (US)

(72) Inventor: Ravishankar Chamarajnagar, Atlanta, GA (US)

(73) Assignee: Airwatch LLC, Atlanta, GA (US)

( * ) Notice: Subject to any disclaimer, the term of this patent is extended or adjusted under 35 U.S.C. 154(b) by 315 days.

(21) Appl. No.: 15/190,572

(22) Filed: Jun. 23, 2016

(65) Prior Publication Data
US 2017/0371932 A1    Dec. 28, 2017

(51) Int. Cl.
| | | |
|---|---|---|
| G06F 16/00 | (2019.01) | |
| G06F 16/2455 | (2019.01) | |
| G06F 7/20 | (2006.01) | |
| G06N 20/00 | (2019.01) | |
| G06F 16/2458 | (2019.01) | |
| G06F 11/07 | (2006.01) | |
| G06F 11/30 | (2006.01) | |
| G06F 11/34 | (2006.01) | |

(52) U.S. Cl.
CPC .......... *G06F 16/24568* (2019.01); *G06F 7/20* (2013.01); *G06F 11/0751* (2013.01); *G06F 11/3006* (2013.01); *G06F 11/3452* (2013.01); *G06F 16/2465* (2019.01); *G06N 20/00* (2019.01)

(58) Field of Classification Search
None
See application file for complete search history.

(56) References Cited

U.S. PATENT DOCUMENTS

| | | | | |
|---|---|---|---|---|
| 9,536,355 | B1* | 1/2017 | Kumar | G06T 19/006 |
| 2007/0005404 | A1* | 1/2007 | Raz | G06Q 40/00 |
| | | | | 705/4 |
| 2010/0027432 | A1* | 2/2010 | Gopalan | H04L 41/142 |
| | | | | 370/252 |

(Continued)

OTHER PUBLICATIONS

N. Srivastava and J. Srivastava, "A hybrid-logic approach towards fault detection in complex cyber-physical systems," in Prognostics and Health Management Society, 2010 Annual Conference of the, 2010, pp. 13-24.

(Continued)

*Primary Examiner* — Bai D Vu
(74) *Attorney, Agent, or Firm* — Thomas | Horstemeyer, LLP

(57) ABSTRACT

Automatic tuning anomaly detection is described. The context metric keys are established during a training phase based on the surrounding context of data received from devices over time. Anomaly and tuning windows are also established for metric ranges of the context metric keys. After the training phase, incoming data is correlated against the keys to identify sets of the data associated with certain context metric keys. For any given context metric key, metric data values in the associated set of data fall either within or outside the metric range of the context metric key. If they fall outside the range for longer than the anomaly window, an alarm is raised. If they fall outside the range for longer than the tuning window, boundaries for the metric range are updated. Additionally, the contextual parameters of the context metric keys are also updated over time, as new data contexts appear.

20 Claims, 5 Drawing Sheets

(56) References Cited

U.S. PATENT DOCUMENTS

| | | | | |
|---|---|---|---|---|
| 2011/0276828 | A1* | 11/2011 | Tamaki | G05B 23/0254 |
| | | | | 714/26 |
| 2015/0269757 | A1* | 9/2015 | Bruemmer | G06K 9/00791 |
| | | | | 345/440 |
| 2016/0342903 | A1* | 11/2016 | Shumpert | G06N 99/005 |
| 2016/0343093 | A1* | 11/2016 | Riland | G06Q 10/04 |
| 2016/0366033 | A1* | 12/2016 | Lange | H04L 41/5009 |
| 2017/0169082 | A1* | 6/2017 | Bingham | G06T 11/206 |
| 2017/0279669 | A1* | 9/2017 | Tapia | H04L 41/0681 |
| 2018/0284735 | A1* | 10/2018 | Cella | G05B 23/024 |

OTHER PUBLICATIONS

A. Mahapatra, N. Srivastava, and J. Srivastava, "Contextual anomaly detection in text data," Algorithms, vol. 5, No. 4, pp. 469-489, 2012. [Online]. Available: http://www.mdpi.com/1999-4893/5/4/469.

V. Chandola, A. Banerjee, and V. Kumar, "Anomaly detection: A survey," ACM Comput. Surv., vol. 41, No. 3, pp. 15:1-15:58, Jul. 2009. [Online]. Available: http://doi.acm.org/10.1145/1541880.1541882.

Y. Kou and C. tien Lu, "Spatial weighted outlier detection," in in Proceedings of SIAM Conference on Data Mining, 2006.

J. Dean and S. Ghemawat, "MapReduce: Simplified data processing on large clusters," Commun. ACM, vol. 51, No. 1, pp. 107-113, Jan. 2008.

B. Miller, N. Arcolano, and N. Bliss, "Efficient anomaly detection in dynamic, attributed graphs: Emerging phenomena and big data," in Intelligence and Security Informatics (ISI), 2013 IEEE International Conference on, 2013, pp. 179-184.

M.A. Hayes, M.A.M. Capretz, Contextual Anomaly Detection in Big Sensor Data, The 3rd IEEE International Congress on Big Data, 2014.

Lin, J., Keogh, E., Lonardi, S. & Chiu, B. (2003) A Symbolic Representation of Time Series, with Implications for Streaming Algorithms. In proceedings of the 8th ACM SIGMOD Workshop on Research Issues in Data Mining and Knowledge Discovery.

[Online]. wikipedia—https://en.wikipedia.org/wiki/Anomaly_detection (Oct. 9, 2018).

* cited by examiner

AUTO TUNING DATA ANOMALY DETECTION

BACKGROUND

Today, large numbers of computing devices are connected to each other over the Internet and similar types of public and private computer networks. In various fields, those computing devices can control and monitor the operation of equipment, appliances, and devices in manufacturing facilities, for infrastructure systems, for automobiles, in residential, commercial, and medical environments, and in other applications. Depending upon the field, those computing devices collect various types of data, such as computing resource usage data, manufacturing parameter data, infrastructure usage data, activity level data, and location data, among other types.

Thus, various types of data can be collected by computing devices, and that data can be communicated over computer networks, stored, and analyzed to determine trends and identify problems. Particularly, as relatively larger datasets are collected from computing devices, those data sets can be analyzed computationally to reveal patterns, trends, and associations.

In the context of relatively large datasets, anomaly detection is related to the identification of data values that do not conform to an expected range in a dataset. Sometimes, an anomalous data value can correspond to some kind of problem, such as bank fraud, a structural defect, a medical problem, or other error or fault. Anomalies can also be referred to as outliers, novelties, noise, deviations, and exceptions.

BRIEF DESCRIPTION OF THE DRAWINGS

Many aspects of the present disclosure can be better understood with reference to the following drawings. The components in the drawings are not necessarily drawn to scale, with emphasis instead being placed upon clearly illustrating the principles of the disclosure. In the drawings, like reference numerals designate corresponding parts throughout the several views.

DETAILED DESCRIPTION

Figure 1:
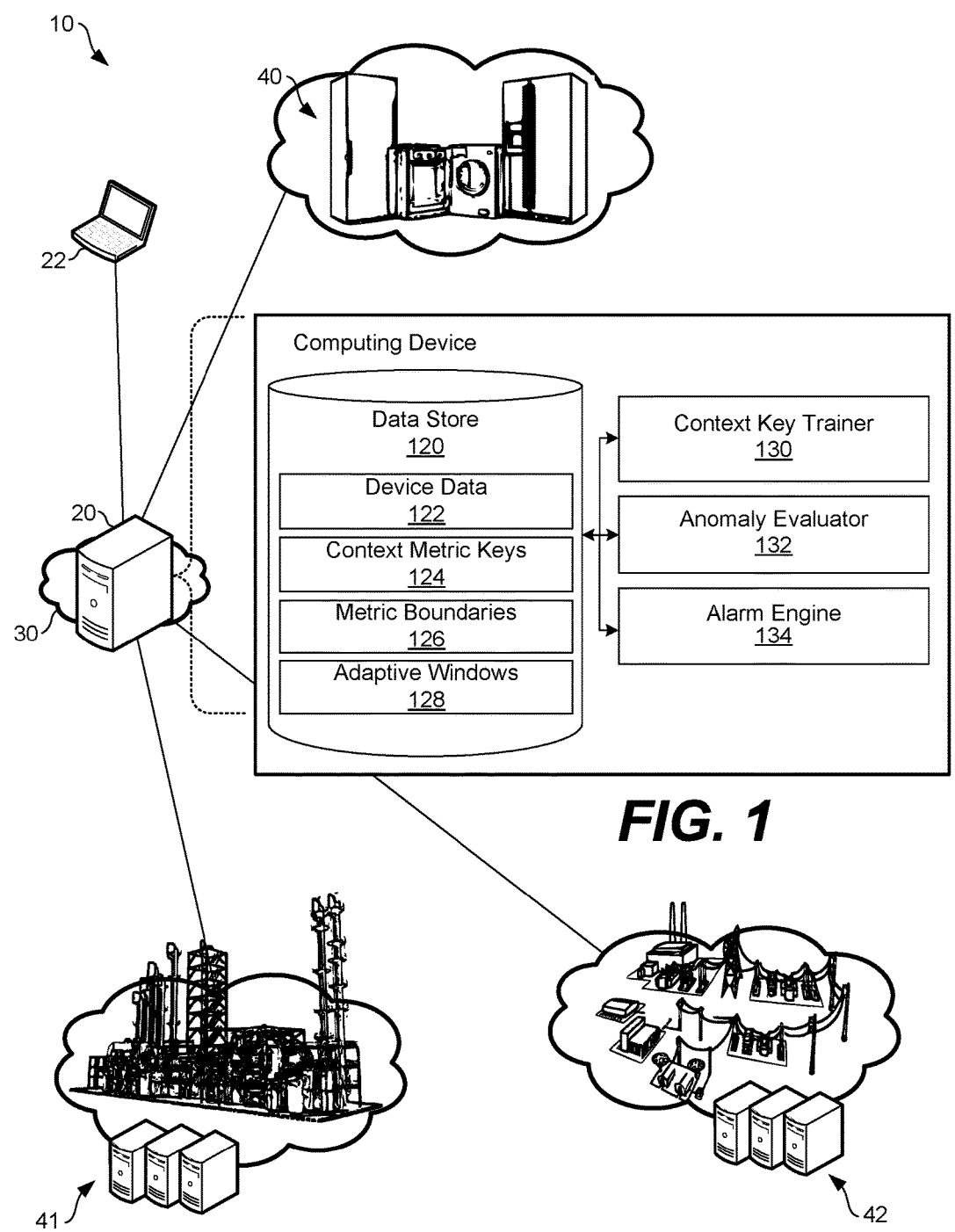
FIG. 1 illustrates an example networked environment for automatic tuning data anomaly detection according to various examples described herein.

As noted above, anomaly detection is related to the identification of data values that do not conform to an expected range of data patterns in relatively large datasets. Sometimes, an anomalous data value can correspond to some kind of problem, such as bank fraud, a structural defect, a medical problem, or other errors and faults. In various contexts, anomalies are also referred to as outliers, novelties, noise, deviations, and exceptions.

Many existing anomaly detection algorithms work with static thresholds and without making decisions based on the context of data. The failure to work with dynamic thresholds and being disconnected from the surrounding context of data leads to several limitations on existing anomaly detection algorithms. For example, when monitoring data transmissions from large numbers of devices, certain devices might transmit more data at night and might transmit less data during the day. An anomaly detection algorithm should account for that time-based contextual difference between night and day activities and create different night and day data rate thresholds for each case. Similarly, temperature-related data values might be different based on the geographic locations where the temperature sensors are located. In that case, an anomaly detection algorithm should account for that location-based contextual difference and create different temperature threshold ranges for the different geographic locations where the temperature sensors are located. Thus, the anomaly detection algorithm should not classify data as an anomaly when a contextually-driven expected variation in the data occurs.

Another area that has seen limited research in anomaly detection algorithms is how to handle sustained or recurring outlier values. While certain transactions in the financial services industry might always be associated with fraudulent practices (and thus anomalies), outlier temperature values might signify a change in temperature trends. Over time, changes in temperature trends might require updates to anomaly detection boundary ranges. As other examples, a refrigerator might start to draw more power and a microwave might take more time to heat food over time. Anomaly detection algorithms should handle these drifts over time and train new thresholds accordingly, rather than continuously treating recurring outlier values as anomalies.

In the context outlined above, automatic tuning anomaly detection devices and processes are described. In one embodiment, a computing device receives various types of data from various types of monitored devices over time. The data includes context data elements and metric data elements. The context data elements define contextual information related to the metric data elements, such as the locations the metric data elements were received from, the times of day the metric data elements were received, the types of devices the metric data elements were received from, and other context-related attributes. During a training phase, the computing device establishes a number of context metric keys based on the context data elements. Thus, the context metric keys are established based on the surrounding context of the metric data elements. Each context metric key can include a unique set of context parameters, such as a unique set of time of day, location, device type, and metric unit parameters associated with a certain set of the metric data elements.

The computing device also associates a metric range with each context metric key and determines suitable boundaries for each metric range during the training phase. Each metric range defines a range of acceptable values for the metric data elements associated with that context metric key. The computing device also establishes anomaly windows for the context metric keys. The anomaly windows can be used to signal an alarm state when metric data values fall outside a metric range for certain period of time. Additionally, the computing device can establish tuning windows for the context metric keys. The tuning windows can be used to determine when new data trends have been established. If a new data trend is identified, the computing device can update the metric range of a context metric key associated with that data trend. Additionally, the computing device can identify and update context parameters of the context metric key over time, as new data contexts appear in received data.

After the training phase, the computing device correlates incoming data against the context metric keys to identify sets of the data associated with certain context metric keys. The computing device then determines whether the metric data values in the set of data associated with a given certain context metric key fall either within or outside the metric range of the context metric key. If they fall outside the metric range for longer than the anomaly window, the computing device can raise an anomaly alarm. If they fall outside the metric range for longer than the tuning window, the computing device can adaptively update the boundaries for the metric range of the context metric key. By updating the boundaries for the metric range, the computing device offers a dynamic approach to account for changes in data trends over time. Similarly, the computing device can identify and update context parameters of context metric keys (or add new context metric keys) over time, and that dynamic approach accounts for the contextual changes associated with incoming data.

Turning to the drawings, the following paragraphs provide an outline of a networked environment followed by a discussion of the operation of the same. FIG. 1 illustrates an example networked environment 10 for automatic tuning data anomaly detection according to various examples described herein. The networked environment 10 includes a computing device 20, a subscriber client device 22, and various devices communicatively coupled to the computing device 20 through the network 30. As examples of the devices coupled through the network 30 to the computing device 20, FIG. 1 illustrates a number of consumer devices 40, manufacturing control devices 50, and infrastructure control devices 60.

The consumer devices 40, manufacturing control devices 50, and infrastructure control devices 60 are provided by way of example of the types of devices that can be communicatively coupled to the computing device 20 through the network 30. The consumer devices 40, manufacturing control devices 41, and infrastructure control devices 42 (collectively "devices 40-42") are representative of devices that can be used to collect and process data at various geographic locations. The devices 40-42 shown in FIG. 1 are merely examples, however, and other types of devices, including those in the form of desktop computers, laptop computers, personal digital assistants, wearable computing devices, cellular telephones, set-top boxes, music or media players, tablet computers, and other computing devices and systems, are within the scope of the disclosure.

The computing device 20 can be embodied as a computer, computing device, or computing system. In certain embodiments, the computing device 20 can include one or more computing devices arranged, for example, in one or more server or computer banks. The computing device or devices can be located at a single installation site or distributed among different geographical locations. The computing device 20 can include a plurality of computing devices that together embody a hosted computing resource, a grid computing resource, or other distributed computing arrangement. In some cases, the computing device 20 can be embodied as an elastic computing resource where an allotted capacity of processing, network, storage, or other computing-related resources varies over time. As further described below, the computing device 20 can also be embodied, in part, as certain functional or logical (e.g., computer-readable instruction) elements or modules. Those elements can be executed to direct the computing device 20 to perform aspects of automatic tuning data anomaly detection described herein.

As shown in FIG. 1, the computing device 20 includes a data store 120. The data store 120 includes memory areas to store device data 122, context metric keys 124, metric boundaries 126, and adaptive windows 128. The computing device 20 also includes a context key trainer 130, an anomaly evaluator 132, and an alarm engine 134. The operation of the computing device 20 is described in greater detail below.

The subscriber client device 22 can be embodied as any computing device, including those in the form of a desktop computer, laptop computer, personal digital assistant, cellular telephone, tablet computer, or other related computing device or system. As described herein, the subscriber client device 22 can receive notifications or messages regarding data anomalies detected by the computing device 20 over time. In various cases, the notifications can be received at the subscriber client device 22 in any form (e.g., text message, e-mail, operating system service or notification, etc.) and in any fashion (e.g., pushed, pulled, polled, etc.).

The devices 40-42 can be embodied as programmable controllers, processing circuits, or computing devices, or any other processor- or logic-based devices or systems capable of gathering and processing data, potentially from various types of sensors or control systems over time. Thus, the devices 40-42 can be embodied, respectively, by the same, similar, or different types of hardware platforms, software platforms, and combinations of hardware and software platforms and can include various types of hardware and software triggers, sensors, detectors, and other data-collecting devices and means. The devices 40-42 shown in FIG. 1 are not limited to any particular field of use, as devices in the industrial, medical, automotive, aviation, automation, service, and other fields are with the scope of the disclosure. Generally, the devices 40-42, as communicatively coupled together in the networked environment 10, embody an Internet-of-Things (JOT) and encompass many different types of connected devices operating in various fields.

The network 30 can include the Internet, intranets, extranets, wide area networks (WANs), local area networks (LANs), wired networks, wireless networks, cable networks, satellite networks, other suitable networks, or any combinations thereof. The computing device 20 and any number of the devices 40-42 can, respectively, be coupled to one or more public or private LANs or WANs and, in turn, to the Internet for communication of data among each other. Although not shown in FIG. 1, the network 30 can also include communicative connections to any number and type of network hosts or devices, such as website servers, file servers, cloud computing resources, databases, data stores, or any other network or computing architectures.

In the networked environment 10, the devices 40-42 can communicate data to the computing device 20 using various data transfer protocols and systems interconnect frameworks, such as hypertext transfer protocol (HTTP), simple object access protocol (SOAP), representational state transfer (REST), real-time transport protocol (RTP), real time streaming protocol (RTSP), real time messaging protocol (RTMP), user datagram protocol (UDP), interne protocol (IP), transmission control protocol (TCP), other protocols and interconnect frameworks, and combinations thereof.

Turning back to the operation of the computing device 20, it is configured to receive data from the devices 40-42 over time and store that data as the device data 122 in the data store 120. As described in further detail below with reference to FIG. 2, the device data 122 can be organized into multiple datasets, where each dataset includes a number of data tuples associated with one of the devices 40-42 (or others). The data tuples can include one or more context data elements associated with metric data elements. The context data elements are related to the surrounding context associated with the metric data elements. For example, the context data elements can define a geographic location where the metric data elements were received from, a time of day the metric data elements were received, a type of device the metric data elements were received from, or a type of sensor the metric data elements were captured by, among many other types of contextual information.

The context metric keys 124 are established and updated by the context key trainer 130. As described with reference to FIG. 2, each context metric key 124 is defined by a unique set of context parameter symbols. The unique set of context parameter symbols is related to a set or subset of the data received from the devices 40-42 and stored in the device data 122. For example, the context key trainer 130 can establish a first context metric key 124 for data received from a first geographic location (or region), at a first time (or time range), and from a first type of device. The context key trainer 130 can also establish a second context metric key 124 for data received from a second geographic location (or region), at a second time (or time range), and from a second type of device. The context parameters described above (e.g., location, time, and device type) are merely examples, however, and context metric keys 124 can be defined using any suitable combination of any types of context parameters.

The context key trainer 130 also establishes a metric range for each of the context metric keys 124. The context key trainer 130 can establish the metric boundaries 126 for each metric range during a training phase. As one example, during the training phase, the context key trainer 130 can correlate data or data tuples stored in the device data 122 against the context metric keys 124 to identify a set of the device data 122 associated with one or more particular context metric keys 124. In that way, the context key trainer 130 compares the context data elements in the data to determine whether the context of the data matches (or falls within a context parameter symbol range of) the context parameters of a context metric key 124. After the context key trainer 130 identifies a set of the device data 122 having context that matches a particular context metric key 124, the metric data elements in that set of the device data 122 can be used to establish (e.g., train) the metric boundaries 126 of the metric range for that context metric key 124. The establishment and training of the metric boundaries 126 of the context metric keys 124 is described in further detail below with reference to FIGS. 2 and 3B.

The context key trainer 130 can also establish the adaptive windows 128 for the context metric keys 124. Among others, the adaptive windows 128 can include an anomaly window and a tuning window for each of the context metric keys 124. The anomaly windows can be used by the anomaly evaluator 132 to signal an alarm state when metric data values fall outside the boundaries of a metric range of a context metric key 124 for a certain period of time. The tuning windows can be used by the anomaly evaluator 132 to determine when new data trends have been established. If a new data trend is identified, the anomaly evaluator 132 can update the boundaries of the metric range of the context metric key 124 associated with that data trend. Additionally, the anomaly evaluator 132 can identify and update context parameters of the context metric keys 124 (and create new context metric keys 124) over time, as new data contexts appear. The time periods of the adaptive windows 128, including the anomaly and tuning windows, can be selected as any suitable period of time depending upon the type of data being analyzed, among other factors.

After the context metric keys 124, metric boundaries 126, and adaptive windows 128 are established, the computing device 20 can proceed to automatically and dynamically detect anomalies in data received from the devices 40-42, as that data is received over time. In that context, the anomaly evaluator 132 is configured to correlate data from the devices 40-42 against the context metric keys 124 to identify sets of the data associated with certain context metric keys 124.

As a set of data which corresponds to a particular context metric key 124 is identified through a context-key-correlation process, the anomaly evaluator 132 also determines whether the metric data values in the set of data matching the particular context metric key 124 fall within or outside the metric range of the particular context metric key 124. If they fall outside the metric range for longer than the associated anomaly window of the particular context metric key 124, the alarm engine 134 can raise an anomaly alarm and transmit an alarm message to the subscriber client device 22. If they fall outside the metric range for longer than the associated tuning window of the particular context metric key 124, the anomaly evaluator 132 can update the boundaries for the metric range of the particular context metric key 124.

By updating the boundaries for metric ranges of the context metric keys 124, the computing device 20 offers a dynamic approach to account for changes in data trends over time. Similarly, the computing device 20 can identify and update context parameters of the context metric keys 124 over time, and that dynamic approach can account for the contextual changes associated with incoming data. Other aspects and examples of the operation of the computing device 20 are described in further detail below with reference to FIGS. 3A-3C.

Figure 2A:
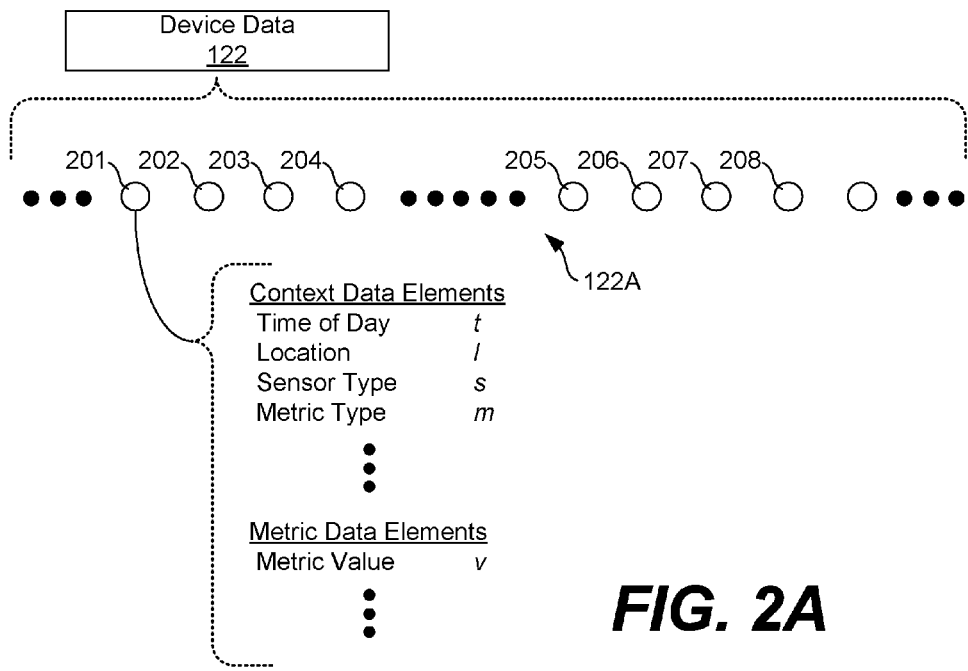
FIG. 2A illustrates examples of context data elements and metric data elements used in the networked environment shown in FIG. 1 according to various examples described herein.

Turning to FIG. 2A, examples of context data elements and metric data elements are illustrated. In FIG. 2A, a data stream or dataset 122A is shown. The data stream 122A is representative of one stream of data or data tuples received from one of the devices 40-42. As shown, the data stream 122A includes data tuples 201-204 separated in time from data tuples 205-208, among other data. The data tuples 201-204 are representative of data values processed during a training phase, and the data tuples 205-208 are representative of data values processed during an analysis or anomaly detection phase. Each of the data tuples 201-208 (among others) includes one or more context data elements and one or more metric data elements. In the example in FIG. 2A, the context data elements of the data tuple 201 (and the remaining data tuples 202-208) include "Time of Day," "Location," "Sensor Type," and "Metric Type" elements which are associated, respectively, with time of day t, location l, sensor type s, and metric type m metric data values. Further, the metric data elements include a "Metric Value" element associated with a metric data value v. In general, the metric data values include measurements or readings of data for analysis, and the context data values include contextual information that can be used to distinguish each metric data value from other metric data values. The use of other types of context and metric data elements is within the scope of the disclosure, as FIG. 2A is a representative example for discussion.

In various cases, the computing device 20 can receive metric data values (e.g., v) from the devices 40-42 with or without any associated context data values (e.g., t, l, s, and m). For example, the computing device 20 can receive temperature data from one of the manufacturing control devices 50 with or without surrounding context data elements, such as which temperature sensor the data is associated with, when the temperature reading was taken, etc. In some cases, the computing device 20 can create context data elements and values to be attributed to the metric data values, as those metric data values are received from the devices 40-42. For example, as the computing device 20 receives temperature data from one of the manufacturing control devices 50, the computing device 20 can store that temperature data along with a locally-generated timing at which it was received as an associated context data value. In other cases, the computing device 20 can receive metric data values from the devices 40-42 along with associated context data values from the devices 40-42.

Figure 2B:
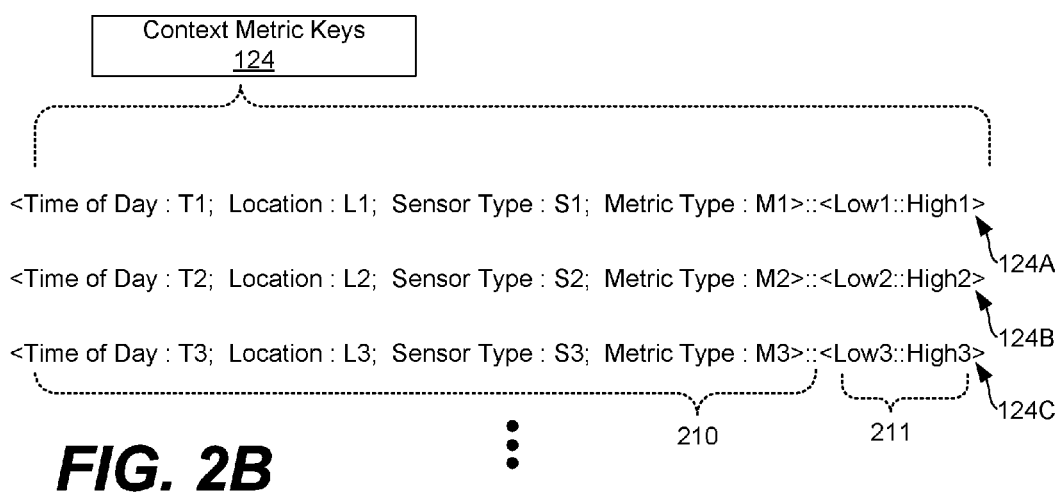
FIG. 2B illustrates examples of context metric keys used in the networked environment shown in FIG. 1 according to various examples described herein.

FIG. 2B illustrates examples of context metric keys 124 generated by the context key trainer 130. The context metric keys 124A-124C are organizational keys for the dataset 122A shown in FIG. 2A. The context metric keys 124A-124C include one or more context parameters 210 and one or more metric ranges 211. For example, the context metric key 124C includes four context parameters 210 including "Time of Day," "Location," "Sensor Type," and "Metric Type" context parameters. The context metric key 124C further includes a metric range 211 including low and high boundaries.

In the example shown in FIG. 2A, the dataset 122A includes the "Time of Day," "Location," "Sensor Type," and "Metric Type" context data elements. Thus, when the context key trainer 130 establishes the context metric keys 124A-124C, corresponding "Time of Day," "Location," "Sensor Type," and "Metric Type" context parameters 210 are established for each of the context metric keys 124A-124C. Other context metric keys can be established with other context parameters based on other context data elements in other datasets.

While the types or categories of the context parameters 210 are the same for the context metric keys 124A-124C, the context parameter symbols differ among the context metric keys 124A-124C. For example, in FIG. 2B, the "Time of Day" context parameter symbol T1 in the context metric key 124A is different than the context parameter symbol T2 in the context metric key 124B and the context parameter symbol T3 in the context metric key 124C. Each of the context parameter symbols T1, T2, and T3 corresponds to a different range of the "Time of Day" context parameter 210 and distinguishes the context metric keys 124A-124C from each other. Similarly, each of the context parameter symbols L1, L2, and L3 can correspond to a different geographic area or region, each of the context parameter symbols S1, S2, and S3 can correspond to a different sensor type, and each of the context parameter symbols M1, M2, and M3 can correspond to a different type of metric (e.g., temperature, pressure, etc.)

The context parameter symbols T1, T2, T3, L1, L2, L3, etc. are used to discretize or group certain ranges of possible contextual data values. In some cases, the context data values (e.g., t, l, s, and m) of the data tuple 201 (and others) in the dataset 122A can include any data values (e.g., a continuous or near-continuous range of values) as they are received from the devices 40-42. For example, the time of day context data value t can range in time from 0:00:00 to 24:00:00, at any suitable level of granularity. To map such continuous or near-continuous ranges of contextual time values to a more limited number of context parameter symbols used in the context metric keys 124, the context key trainer 130 discretizes the possible range of the time of day context data values t into a smaller subset of symbol ranges T1, T2, and T3, each of which corresponds to a different range of time values. The context parameter symbols T1, T2, and T3 might correspond to equal ranges of time during a day (e.g., 8 hours each), but it is not necessary that the ranges be equal. For example, more granularity might be desired during the hours of 8 AM to 11 AM for the context parameter T1, and the other context parameters T2 and T3 can be associated with the remainder of time during a day.

Not all context data values are expected to have continuous or near-continuous ranges of values, however. For example, the sensor type context data value s might be expected to have merely one of three values to designate one of three different types of sensors. In that case, the corresponding context parameter symbols S1, S2, and S3 each correspond to a different sensor type and do not correspond to ranges.

During the training phase, the context key trainer 130 establishes the high and low boundaries of the metric ranges 211 for the context metric keys 124A-124C. As shown in FIG. 2B, the context metric keys 124A-124C each include respective high, "High1," "High2," and "High3," and low, "Low1," "Low2," and "Low3" boundaries. These high and low boundaries can be determined by the context key trainer 130 by identifying the lowest and highest metric data values v among the data tuples 201-204 that match (e.g., correlate with) the context parameters 210 of one of the context metric keys 124A-124C. The lowest and highest metric data values v can be identified during any period of time over the training phase. In FIG. 2A, the data tuples 201-204 are representative of data values processed during the training phase, and the data tuples 205-208 are representative of data values processed during the analysis or anomaly detection phase. Further aspects of the operation of the computing device 20 are described in the process flow diagrams below.

Figure 3A:
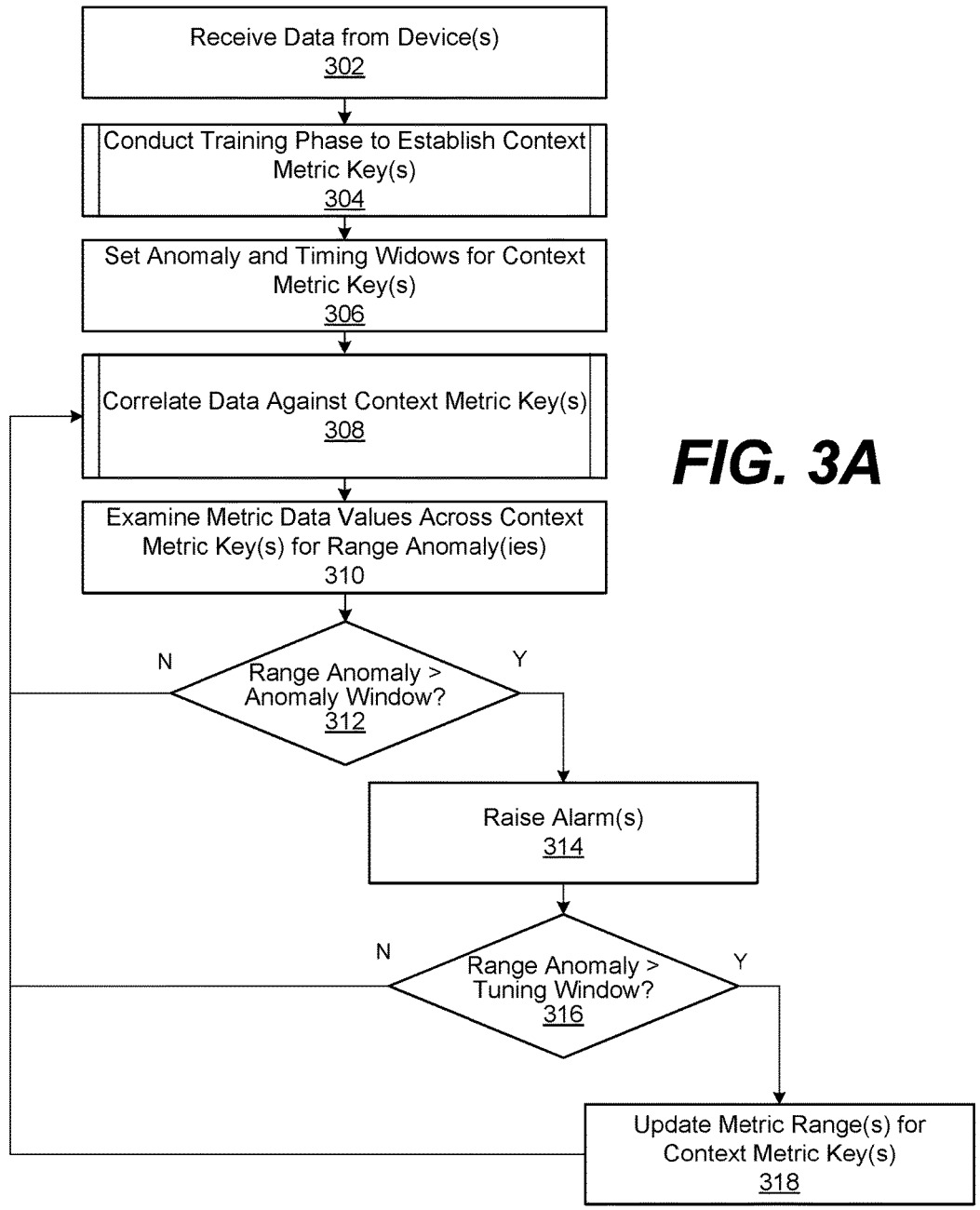
FIGS. 3A-3C illustrate a process for auto tuning data anomaly detection according to various examples described herein.
Figure 3B:
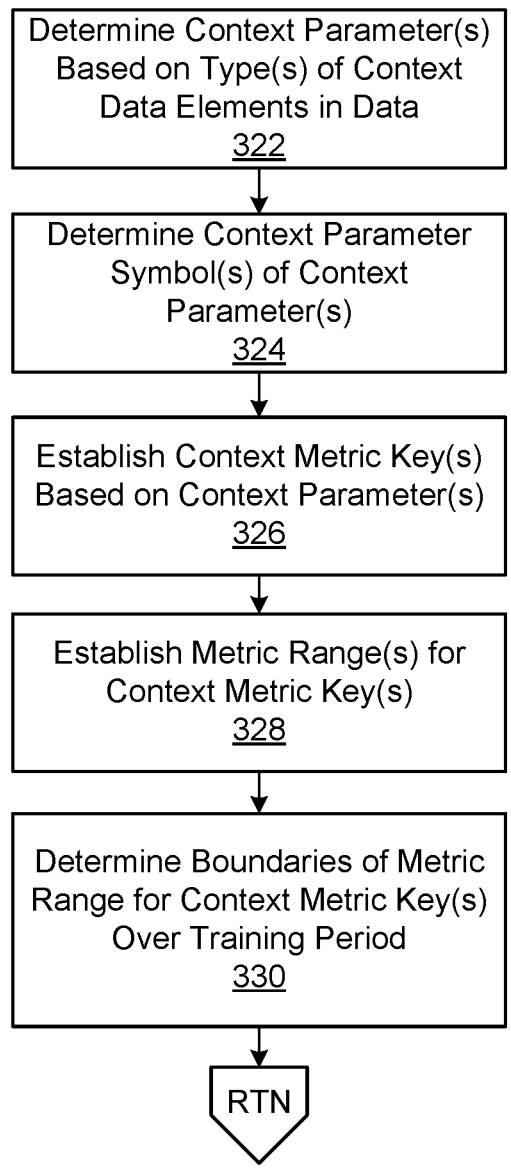
Figure 3C:
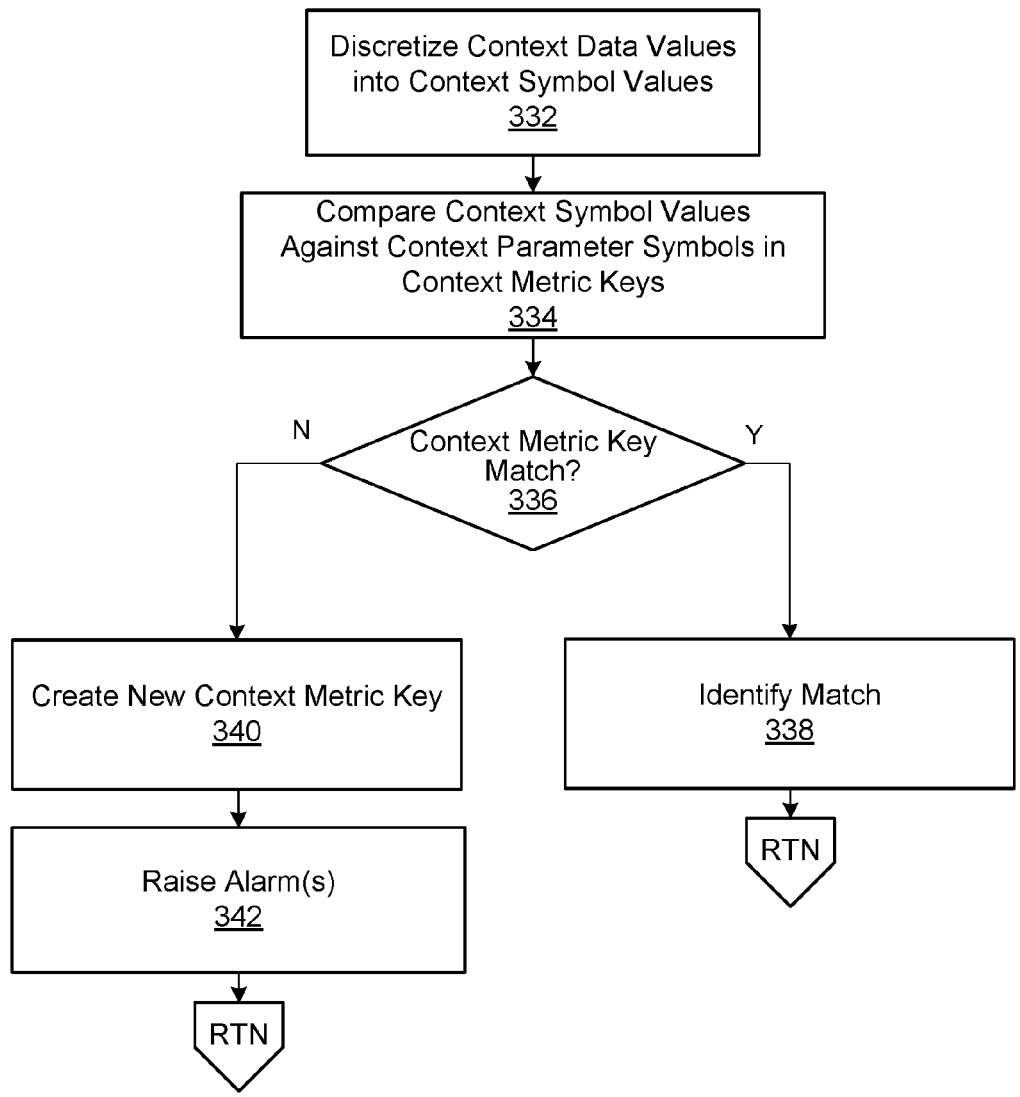

FIGS. 3A-3C illustrate a process for auto tuning data anomaly detection according to various examples described herein. The process illustrated in FIGS. 3A-3C is described in connection with the computing device 20 shown in FIG. 1, although other computing devices could perform the process. Although the flowcharts show a specific order of execution, the order of execution can differ from that which is shown. For example, the order of execution of two or more elements can be switched relative to the order shown. Also, two or more elements shown in succession can be executed concurrently or with partial concurrence. Further, in some examples, one or more of the elements shown in the flowcharts can be skipped or omitted.

At step 302, the process includes the computing device 20 receiving data from one or more devices over time. The data can include any type of data for analysis, including the example types described herein and others. The data can be received from any devices, including any of the example devices 40-42 described herein and others. As discussed above, the data can include context data elements and metric data elements and be stored as the device data 122 in the data store 120. Although step 302 is shown at the outset of the process in FIG. 3A, the computing device 20 can continue to receive data throughout the steps shown in FIGS. 3A-3C.

At step 304, the process includes the context key trainer 130 conducting a training phase to establish context metric keys 124 associated with the data received at step 302. For example, the context key trainer 130 can establish the context metric keys 124A-124C shown in FIG. 2B using the data tuples 201-204 shown in FIG. 2A (e.g., the training phase data tuples 201-204), and this process is described in greater detail below with reference to FIG. 3B. As described herein, the context metric keys 124A-124C are organizational keys used by the anomaly evaluator 132 to conduct context-based anomaly analysis.

At step 306, the process includes the context key trainer 130 setting an anomaly window and a tuning window for each of the context metric keys established at step 304. The anomaly and tuning windows can be stored as adaptive windows 128 in the data store 120 for reference by the anomaly evaluator 132 in later steps. As described herein, the anomaly windows can be used to signal an alarm state when metric data values fall outside a metric range for a certain period of time. Additionally, the tuning windows can be used to determine when new data trends have been established and one or more of the context metric keys 124 should be updated.

After the context metric keys 124 have been established at step 304 and the adaptive windows 128 set at step 306, the process enters a phase of automatic or adaptive anomaly detection. At step 308, the process includes the anomaly evaluator 132 correlating the device data 122 against one or more of the context metric keys 124 established at step 304 to identify one or more sets of the data associated, respectively, with the context metric keys 124. The correlation of data and identification of the sets of data that match certain context metric keys 124 is described in further detail below with reference to FIG. 3C. As an example, the anomaly evaluator 132 can correlate the context data elements in the data tuples 205-208 shown in FIG. 2A (e.g., among others, the analysis or anomaly detection phase data tuples 205-208) against the context metric keys 124A-124C shown in FIG. 2B. In doing so, the anomaly evaluator 132 might identify that the context data elements of the data tuples 205-208 match the context metric key 124C (and do not match the context metric keys 124A or 124B) because the context data elements in the data tuples 205-208, once discretized, match with the context parameter symbols T3, L3, S3, and M3 of the context metric key 124C.

At step 310, the process includes the anomaly evaluator 132 examining the metric data values having corresponding context data values that match (as determined at step 308) with a particular context metric key 124. Continuing with the example case that the context data elements of the data tuples 205-208 match the context metric key 124C, the anomaly evaluator 132 compares the metric data values v of the data tuples 205-208 to determine whether they fall either within or outside the metric range 211 of the context metric key 124C. Any metric data values v of the data tuples 205-208 which do not fall within the metric range 211 of the context metric key 124C are anomalies.

However, in one example case, an alarm is not signaled unless such data anomalies persist for a period of time longer than the anomaly window set at step 306. That is, at step 312, the process includes the anomaly evaluator 132 determining whether the metric data values v of the data tuples 205-208 (and potentially others) fall outside the metric range 211 of the context metric key 124C for a period of time greater than the anomaly window set at step 306. If not, then the process proceeds back to step 308 to examine more data (e.g., no alarm is raised). Otherwise, if the metric data values v of the data tuples 205-208 (and potentially others) fall outside the metric range 211 of the context metric key 124C for a period of time greater than the anomaly window, the process proceeds to step 314.

At step 314, the process includes the alarm engine 134 raising an alarm. For example, the alarm engine 134 can transmit an alarm message or indicator, of any type and form, to the subscriber client device 22. The alarm message can indicate that the metric data values v of the data tuples 205-208 (and potentially others) have fallen outside the metric range 211 of the context metric key 124C for a certain period of time. In turn, the appropriate actions can be taken to address or mitigate any problems attributed to the anomaly.

If, however, the metric data values v of the data tuples 205-208 fall outside the metric range of the context metric key 124C for a period of time longer than the timing window set at step 306 (which can be longer than the anomaly window), that length of data "anomalies" may signify a new data trend. Thus, at step 316, the process includes the anomaly evaluator 132 determining whether the metric data values v of the data tuples 205-208 (and potentially others) fall outside the metric range 211 of the context metric key 124C for a period of time greater than the tuning window set at step 316. If not, then the process proceeds back to step 308 to examine more data. Otherwise, if the metric data values v of the data tuples 205-208 (and potentially others) fall outside the metric range 211 of the context metric key 124C for a period of time greater than the tuning window, then the process proceeds to step 318.

At step 318, the process includes the context key trainer 130 updating the metric range 211 of the context metric key 124C to account for the new metric data values v of the data tuples 205-208 which have fallen outside the metric range 211 of the context metric key 124C for longer than the tuning window. This may result in raising the "High3" boundary of the metric range 211, lowering the "Low3" boundary of the metric range 211, or both, to account for the new higher or lower metric data values v. After step 318, the process proceeds back to step 308 to continue the analysis of data.

FIG. 3B illustrates the steps in conducting the training phase at step 304 in FIG. 3A. Again, the steps in FIG. 3B are described in connection with the example data tuples 201-204 and context metric keys 124A-124C shown in FIGS. 2A and 2B, but could be performed using other data and context metric keys. As shown, at step 322, the process includes the context key trainer 130 determining the context parameters 210 of the context metric keys 124A-124C based on the type(s) of the context data elements in data tuples 201-204 (among other training data in the device data 122). In the example shown in FIG. 2A, the data tuples 201-204 include the "Time of Day," "Location," "Sensor Type," and "Metric Type" context data elements. Thus, when the context key trainer 130 establishes the context metric keys 124A-124C, corresponding "Time of Day," "Location," "Sensor Type," and "Metric Type" context parameters 210 are established for each of the context metric keys 124A-124C.

At step 324, the process includes the context key trainer 130 determining the set of available context parameter symbols associated with the context parameters 210. The context parameter symbols are used to discretize or group certain ranges of possible contextual data values. To map continuous or near-continuous ranges of the context data values (e.g., t, l, s, and m) to a more limited number of context parameter symbols in the context metric keys 124, the context key trainer 130 discretizes the possible range of the context data values into a smaller subset of symbol ranges, each of which corresponds to a different range of the context data values. For example, the context parameter symbols T1, T2, and T3 might correspond to different contextual ranges of time during a day.

At step 326, the process includes the context key trainer 130 establishing the context metric keys 124A-124C (among others) based on the context parameters determined at step 322 and the context parameter symbols determined at step 324. In one example case, each context metric key 124 is established based on a unique or different set of context parameter symbols. As shown in FIG. 2B, each of the context metric keys 124A-124C includes a different set or combination of the context parameter symbols T1, T2, and T3, L1, L2, and L3, S1, S2, and S3, and M1, M2, and M3. The context metric keys 124A-124C shown in FIG. 2B are not exhaustive, however, as they do not account for every unique permutation of the context parameter symbols. In certain cases, the context key trainer 130 might establish a context metric key 124 for every possible unique permutation of the context parameter symbols determined at step 324, although it is not necessary that every combination or permutation be accounted for.

At step 328, the process includes the context key trainer 130 establishing one or more metric ranges 211 for one or more of the context metric keys 124A-124C established at step 326. In some cases, only one metric range 211 is attributed to each of the context metric keys 124A-124C. In other cases, such as if the data tuples 201-204 include one than one metric data value, then more than one metric range can be attributed to the context metric keys 124A-124C.

At step 330, the context key trainer 130 establishes the high and low boundaries of the metric ranges 211. As shown in FIG. 2B, the context metric keys 124A-124C each include respective high and low boundaries. These high and low boundaries can be determined by the context key trainer 130 by identifying the lowest and highest metric data values v among all the data tuples 201-204 that match (e.g., correlate with) the context parameters 210 of one of the context metric keys 124A-124C. Thus, during the training phase, the highest and lowest values of the metric data values v are used to create the boundaries of the metric ranges 211, using the limited set of the data tuples 201-204 during the training phase.

FIG. 3C illustrates the steps in correlating data against context metric keys at step 308 in FIG. 3A. The steps illustrated in FIG. 3C occur after the training phase has concluded. At step 332, the process includes the anomaly evaluator 132 discretizing context data values into context symbol values. The context parameter symbols are representative of discretized ranges of the context data values of the data tuples 205-208, for example, among other data tuples in the dataset 122A. As noted above, the context data values (e.g., t, l, s, and m) of the data tuples 205-208 (and others) in the dataset 122A can include any data values (e.g., a continuous or near-continuous range of values) as they are received from the devices 40-42. To map such continuous or near-continuous ranges of time values to a number of context metric keys, the anomaly evaluator 132 discretizes the possible range of context data values into a smaller subset of context symbol ranges, each of which corresponds to a different range of values.

As one example, the context parameter symbols T1, T2, and T3 shown in FIG. 2B might correspond to equal ranges of time during a day (e.g., 8 hours each), but it is not necessary that the ranges be equal. For example, more granularity might be desired during the hours of 8 AM to 11 AM for the context parameter T1, and the other context parameters T2 and T3 can be associated with the remainder of time during a day. Not all context data values are expected to have continuous or near-continuous ranges of values, however. For example, the sensor type context data value s might be expected to have merely one of three values to designate one of three different types of sensors. In that case, the corresponding context parameter symbols S1, S2, and S3 each correspond to a different sensor type and do not correspond to ranges.

At step 334, the process includes the anomaly evaluator 132 comparing the context symbol values of the data tuples 205-208 (among others) generated at step 332 against the context parameter symbols in the context metric keys 124. Here, the process seeks to determine which of the data tuples 205-208 contextually match a particular context metric key 124. At step 336, the process includes the anomaly evaluator 132 determining whether the context parameter symbols of the data tuples 205-208 match with a particular context metric key 124. As an example, the anomaly evaluator 132 can correlate or compare the discretized context data elements of the data tuples 205-208 shown in FIG. 2A against the context metric keys 124A-124C shown in FIG. 2B. In doing so, the anomaly evaluator 132 might identify that context symbol values of the data tuples 205-208 match the context metric key 124C (and do not match the context metric keys 124A or 124B) because the context symbol values of the data tuples 205-208 match with the context parameter symbols T3, L3, S3, and M3 of the context metric key 124C. If a match is found, the process proceeds to step 338. If no match is found, the process proceeds to step 340.

If at match is found, at step 338, the process includes the anomaly evaluator 132 identifying a match between one or more of the data tuples 205-208 and the context metric keys 124. For example, the anomaly evaluator 132 might identify that context symbol values of the data tuples 205-208 match the context metric key 124C (and do not match the context metric keys 124A or 124B) because the context symbol values of the data tuples 205-208 match with the context parameter symbols T3, L3, S3, and M3 of the context metric key 124C. In that case, the process proceeds back to step 310 in FIG. 3A to examine whether the metric data values v of the data tuples 205-208 fall either within or outside the metric range 211 of the context metric key 124C.

On the other hand, if no match is found, the process proceeds to step 340. At step 340, the anomaly evaluator 132 has identified that one of the data tuples 205-208 includes a contextual element which does not match any of the context metric keys 124 determined during the training phase. Thus, the context key trainer 130 can create a new context metric key 124 to account for the new contextual element. In some cases, a new context metric key 124 might be established at step 340 only if the new contextual information persists in data received over a window of time. If created, the new context metric key can be trained in a manner similar to that shown in FIG. 3B.

Additionally or alternatively at step 342, the context key trainer 130 can update a current one of the context metric keys 124 to account for the new contextual element. For example, one or more ranges of one or more context parameter symbols in a context metric key 124 can be expanded to encompass the new contextual element.

At step 342, the process includes the alarm engine 134 raising an alarm. For example, the alarm engine 134 can transmit an alarm message or indicator, of any type and form, to the subscriber client device 22. The alarm message can indicate that one or more of the context data values (e.g., t, l, s, and m) of the data tuples 205-208 (and potentially others) include new contextual information or a new contextual case. This may occur, for example, if a new sensor is installed at a new geographic location. It is not necessary that an alarm is raised at step 342, however. In some cases, an alarm might only be raised if the new contextual information arises in data over a window of time. From step 342, the process proceeds back to step 310 in FIG. 3A.

The flowcharts of FIGS. 3A-3C show examples of the functionality and operation of implementations of components described herein. The components described herein can be embodied in hardware, software, or a combination of hardware and software. If embodied in software, each element can represent a module of code or a portion of code that includes program instructions to implement the specified logical function(s). The program instructions can be embodied in the form of, for example, source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

The computing device 20 can include at least one processing circuit. Such a processing circuit can include, for example, one or more processors and one or more storage devices that are coupled to a local interface. The local interface can include, for example, a data bus with an accompanying address/control bus or any other suitable bus structure.

The storage devices for a processing circuit can store data or components that are executable by the processors of the processing circuit. For example, the context key trainer 130, anomaly evaluator 132, alarm engine 134, and/or other components can be stored in one or more storage devices and be executable by one or more processors in the computing device 20. Also, a data store, such as the data store 120 can be stored in the one or more storage devices.

The the context key trainer 130, anomaly evaluator 132, alarm engine 134, and other components described herein can be embodied in the form of hardware, as software components that are executable by hardware, or as a combination of software and hardware. If embodied as hardware, the components described herein can be implemented as a circuit or state machine that employs any suitable hardware technology. The hardware technology can include, for example, one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

Also, one or more or more of the components described herein that include software or program instructions can be embodied in any non-transitory computer-readable medium for use by or in connection with an instruction execution system such as, a processor in a computer system or other system. The computer-readable medium can contain, store, and/or maintain the software or program instructions for use by or in connection with the instruction execution system.

A computer-readable medium can include a physical media, such as, magnetic, optical, semiconductor, and/or other suitable media. Examples of a suitable computer-readable media include, but are not limited to, solid-state drives, magnetic drives, or flash memory. Further, any logic or component described herein can be implemented and structured in a variety of ways. For example, one or more components described can be implemented as modules or components of a single application. Further, one or more components described herein can be executed in one computing device or by using multiple computing devices.

Further, any logic or applications described herein, including the context key trainer 130, anomaly evaluator 132, and alarm engine 134 can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices. Additionally, terms such as "application," "service," "system," "engine," "module," and so on can be used interchangeably and are not intended to be limiting.

The above-described examples of the present disclosure are merely possible examples of implementations set forth for a clear understanding of the principles of the disclosure. Many variations and modifications can be made without departing substantially from the spirit and principles of the disclosure. All such modifications and variations are intended to be included herein within the scope of this disclosure and protected by the following claims.

Therefore, the following is claimed:

1. A non-transitory computer-readable medium embodying program code executable in at least one computing device, the program code being configured to cause the at least one computing device to at least:
   receive data from a plurality of devices over time;
   establish a set of context parameter symbols and a metric range of a context metric key based on the data during a training phase;
   set an anomaly window and a tuning window for the context metric key;
   correlate at least a portion of the data against the set of context parameter symbols of the context metric key to identify a set of the data that matches with the context metric key;
   determine that a plurality of metric data values in the set of the data fall outside the metric range of the context metric key for a certain period of time greater than the anomaly window; and
   raise an alert.

2. The non-transitory computer-readable medium according to claim 1, wherein the program code is further configured to cause the at least one computing device to:
   determine that the plurality of metric data values in the set of the data fall outside the metric range of the context metric key for a period of time greater than the tuning window; and
   update at least one boundary of the metric range.

3. The non-transitory computer-readable medium according to claim 1, wherein the data is organized into a plurality of data tuples, and individual ones of the plurality of data tuples comprise a plurality of context data elements and a plurality of metric data elements.

4. The non-transitory computer-readable medium according to claim 3, wherein the plurality of context data elements are associated with at least one of a location the data was received from, a time of day the data was received, or a type of device the data was received from.

5. The non-transitory computer-readable medium according to claim 3, wherein to establish the context metric key, the program code is further configured to cause the at least one computing device to:

determine the set of context parameter symbols based on different types of individual ones of the plurality of context data elements in the plurality of data tuples; and establish the context metric key based on the set of context parameter symbols.

6. The non-transitory computer-readable medium according to claim 5, wherein to establish the context metric key, the program code is further configured to cause the at least one computing device to:

establish the metric range for the context metric key based on the plurality of metric data elements in the plurality of data tuples.

7. The non-transitory computer-readable medium according to claim 6, wherein the program code is further configured to cause the at least one computing device to:

conduct the training phase over a first period of time based on the data to determine at least one boundary of the metric range of the context metric key.

8. The non-transitory computer-readable medium according to claim 3, wherein to identify the set of the data that matches with the context metric key, the program code is further configured to cause the at least one computing device to:

discretize data values of the plurality of context data elements into a plurality of context symbol values; and compare the plurality of context symbol values against the set of context parameter symbols of the context metric key to determine whether at least one of the plurality of context symbol values matches at least one of the set of context parameter symbols.

9. A method, comprising:

receiving, by at least one computing device, data from a plurality of devices;

conducting, by the at least one computing device, a training phase to establish a set of context parameter symbols and a metric range of a context metric key based on the data;

setting, by the at least one computing device, an anomaly window and a tuning window for the context metric key;

correlating, by the at least one computing device, at least a portion of the data against the set of context parameter symbols to identify a set of the data that matches with the context metric key;

determining, by the at least one computing device, that a plurality of metric data values in the set of the data fall outside the metric range of the context metric key for a certain period of time greater than the tuning window; and updating, by the at least one computing device, at least one boundary of the metric range.

10. The method of claim 9, further comprising:

determining, by the at least one computing device, that the plurality of metric data values in the set of the data fall outside the metric range of the context metric key for a period of time greater than the anomaly window but less than the tuning window; and raising, by the at least one computing device, an alert.

11. The method of claim 9, wherein the data comprises a plurality of context data elements and a plurality of metric data elements.

12. The method of claim 11, wherein the plurality of context data elements are associated with at least one of a location the data was received from, a time of day the data was received, or a type of device the data was received from.

13. The method of claim 11, wherein conducting the training phase comprises:

determining, by the at least one computing device, the set of context parameter symbols based on the plurality of context data elements; and establishing, by the at least one computing device, the context metric key based on the set of context parameter symbols.

14. The method of claim 11, wherein conducting the training phase further comprises determining, by the at least one computing device, at least one boundary of the metric range for the context metric key based on the plurality of metric data elements.

15. The method of claim 11, wherein correlating at least the portion of the data against the set of context parameter symbols comprises:

discretizing, by the at least one computing device, data values of the plurality of context data elements into a plurality of context symbol values; and comparing, by the at least one computing device, the plurality of context symbol values against the set of context parameter symbols of the context metric key to determine whether at least one of the plurality of context symbol values matches at least one of the set of context parameter symbols.

16. The method of claim 15, wherein correlating at least the portion of the data against the set of context parameter symbols comprises:

determining, by the at least one computing device, whether one of the plurality of context symbol values does not match any context parameter symbol among the set of context parameter symbols of the context metric key; and updating, by the at least one computing device, the set of context parameter symbols of the context metric key to include a new context metric symbol in an instance in which the one of the plurality of context symbol values does not match any context parameter symbol among the set of context parameter symbols.

17. A method, comprising:

receiving, by at least one computing device, data from a plurality of devices;

establishing, by the at least one computing device, a set of context parameter symbols and a metric range of a context metric key based on the data during a training phase;

setting, by the at least one computing device, an anomaly window for the context metric key;

correlating, by the at least one computing device, at least a portion of the data against the set of context parameter symbols of the context metric key to identify a set of the data that matches with the context metric key; and determining, by the at least one computing device, whether a plurality of metric data values in the set of the data fall outside the metric range of the context metric key for a certain period of time greater than the anomaly window.

18. The method of claim 17, further comprising raising, by the at least one computing device, an alert when it is determined that the plurality of metric data values fall outside the metric range for greater than the anomaly window.

19. The method of claim 17, further comprising:

setting, by the at least one computing device, a tuning window for analysis of the data;

determining, by the at least one computing device, that the plurality of metric data values in the set of the data fall outside the metric range of the context metric key for a period of time greater than the tuning window; and updating, by the at least one computing device, at least one boundary of the metric range.

20. The method of claim 17, wherein:

the data comprises a plurality of context data elements and a plurality of metric data elements; and the plurality of context data elements are associated with at least one of a location the data was received from, a time of day the data was received, or a type of device the data was received from.

* * * * *